United States Patent [19]

Bissessur et al.

[11] Patent Number: 5,751,872
[45] Date of Patent: May 12, 1998

[54] WAVELENGTH DEMULTIPLEXER

[75] Inventors: Hans Bissessur; Roland Mestric, both of Paris; Christian Duchet, Marcoussis, all of France

[73] Assignee: Alcatel Alsthom Compagnie Generale d'Electricite, Paris, France

[21] Appl. No.: 772,527

[22] Filed: Dec. 24, 1996

[30] Foreign Application Priority Data

Dec. 28, 1995 [FR] France ................................ 95 15657

[51] Int. Cl.⁶ ........................................................ G02B 6/34
[52] U.S. Cl. .................................................. 385/37; 385/46
[58] Field of Search ................................ 385/37, 46, 24, 385/15

[56] References Cited

U.S. PATENT DOCUMENTS

| | | | |
|---|---|---|---|
| 5,136,571 | 8/1992 | Dragone | 385/37 |
| 5,212,758 | 5/1993 | Adar et al. | 385/129 |
| 5,243,672 | 9/1993 | Dragone | 385/46 |
| 5,339,157 | 8/1994 | Glance et al. | 385/24 |
| 5,367,586 | 11/1994 | Glance et al. | 385/24 |
| 5,617,234 | 4/1997 | Koga et al. | 385/37 |

FOREIGN PATENT DOCUMENTS

0568236A2  11/1993  European Pat. Off. .

OTHER PUBLICATIONS

Hiroshi Takahashi et al, "Wavelength Multiplexer Based on SI02–TA 205 Arrayed–Waveguide Grating", *Journal of Lightwave Technology*, vol. 12, No. 6, 1 Jun. 1994, pp. 989–995.

A. R. Vellekoop et al, "A Small–Size Polarization Splitter Based on a Planar Optical Phased Array", *Journal of Lightwave Technology*, vol. 8, No. 1, 1 Jan. 1990, pp. 118–124.

R. Adar, "Broad–Band Array Mulplexers Made with Silica Waveguides on Silicon", *Journal of Lightwave Technology*, vol. 11, No. 2, 1 Feb. 1993, pp. 212–219.

Kenji Kawano et al, "Design of InGaas–Inalas Multiple–Quantum–Well (MQW) Optical Modulators", *IEEE Journal of Quantum Electronics*, vol. 28, No. 1, 1 Jan. 1992, pp. 224–230.

*Primary Examiner*—John Ngo
*Attorney, Agent, or Firm*—Sughrue, Mion, Zinn, Macpeak & Seas, PLLC

[57] ABSTRACT

The demultiplexer comprises a diffraction space defined by a reception surface coupled to a grating. In order to obtain output waves of flattened spectral response, the input waveguide and the reception surface are dimensioned so that the input wave diffracts over said surface and presents a plurality of secondary lobes. The demultiplexer is particularly applicable to optical communications systems with wavelength multiplexing.

13 Claims, 6 Drawing Sheets

WAVELENGTH DEMULTIPLEXER

The invention lies in the field of photon components and relates more particularly to wavelength demultiplexers.

BACKGROUND OF THE INVENTION

Such devices, generally implemented as integrated components, have numerous applications in optical communications systems making use of wavelength division multiplexing (WDM).

Of the various known types of passive multiplexers or demultiplexers, we are concerned with those that use an angularly dispersive element constituted by an etched diffraction grating or by a grating formed by waveguides of different lengths.

An example of an etched grating demultiplexer is described in the article entitled "Grating spectrograph in InGaAsP/InP for dense wavelength division multiplexing" by C. Cremer et al., Applied Physics Letters, 59 (6), Aug. 5, 1991, pp. 627 and 628.

An embodiment of a waveguide grating demultiplexer is described in U.S. Pat. No. 5,212,758.

For application to optical communications systems, those two types of apparatus present the advantage of being realizable in integrated form, thereby making it possible to limit coupling losses. However, a problem that arises in that application is ensuring that small shifts in wavelength carried by the input multiplex do not give rise to a loss of power in the waves delivered to the output. It is therefore appropriate for each output wave from the demultiplexer to present a response as a function of wavelength that is as constant as possible in the vicinity of the wavelength allocated to said output. In other words, the curve representing said response should be of a form that is as close as possible to a rectangle.

A first solution has been proposed in the article "Phased-array wavelength demultiplexer with flattened wavelength response" by M. R. Amersfoort et al., Electronics Letters, Feb. 17, 1994, Vol. 30, No. 4, pp. 300 to 302. That article describes an integrated demultiplexer constituted by two star couplers that are connected together by a grating made up of waveguides of different lengths. To obtain a flat spectral response, it is proposed that multimode output waveguides should be used, thereby enabling a plurality of modes to be recombined. Nevertheless, that solution is not usable if it is desired to couple the outputs to respective optical fibers or monomode waveguides, and it is therefore advantageous only for an end-of-line component followed by a detector.

Another solution using the same type of demultiplexer is described in the article "Arrayed-waveguide grating multiplexer with flat spectral response" by K. Okamoto and H. Yamada, Optics Letters, Jan. 1, 1995, Vol. 20, No. 1, pp. 43 to 45.

In that article, the ends of the waveguides of the grating are of different widths so as to collect a greater or lesser fraction of the light they receive. By distributing energy in accordance with a cardinal sine (sinc) relationship, each wave output by the apparatus has a spectrum response that is substantially in the form of a rectangle.

The main drawback of that method is that it significantly increases the losses of the apparatus (by about 2 dB). In addition, because of the variation in the width of the waveguides in the array, controlling phase in each of the waveguides is very difficult.

OBJECTS AND SUMMARY OF THE INVENTION

An object of the present invention is to propose another solution avoiding the drawbacks of the above-mentioned known solutions and equally capable of being applied to etched grating demultiplexers and to demultiplexers having a grating in the form of an array of waveguides. A detailed analysis of the operation of those two types of apparatus shows that the output waves are obtained from the input wave by two successive operations. The first operation is diffraction of the input wave in a coupler. The second operation is angular dispersion due to the etched grating or to the waveguide grating. Mathematically speaking, and providing appropriate dimensions are used, the first operation (diffraction) can be treated to a first approximation as a Fourier transform in one-dimensional free space. The second operation (dispersion) can then be considered as an inverse Fourier transform of the diffracted wave both in space and in the wavelength domain.

Thus, by satisfying dimensioning conditions explained below, the spectral response of each output wave is represented by a curve of substantially the same shape as that which represents variation in the amplitude of the input wave as a function of lateral position in the input waveguide.

More precisely, the invention provides a wavelength demultiplexer comprising a diffraction space, a grating, and a focusing surface, said diffraction space including at least one input coupled to an input waveguide and a reception surface situated facing said input and coupled to the grating, said input waveguide serving to inject an input optical wave into the diffraction space, said grating being designed to focus an output wave on the focusing surface at a position that is a function of the wavelength of the input wave, wherein said input waveguide and said reception surface are dimensioned in such a manner that in response to an input optical wave a diffracted wave is formed on the reception surface having amplitude as a function of position on the reception surface presenting at least a portion having a plurality of secondary lobes.

The existence of close-together secondary lobes on the reception surface depends on the input wave being sufficiently confined laterally, with the extent of confinement usually being measured by the "confinement factor" which is defined as the ratio of the optical power of the portion of the wave defined by the waveguide over the total optical power contained in the waveguide and in the regions surrounding it. Likewise, the "lateral confinement factor" is defined as the ratio of the optical power contained in the space defined by the lateral edges of the waveguide over the total optical power.

Thus, in one aspect of the invention, the input waveguide includes a wave-guiding layer defined laterally by a medium of refractive index lower than that of the wave-guiding layer, and the dimensions of the cross-section of the wave-guiding layer and the values of said refractive indices are selected in such a manner that the input waveguide has a lateral confinement factor of not less than 95%.

In another aspect, the input waveguide is made from a buried wave-guiding layer that has been subjected to lateral etching. In this disposition, the medium laterally defining the wave-guiding layer is air, which provides the greatest possible size of step in refractive index. As a result the lateral confinement factor is at a maximum for given shape and composition of the wave-guiding layer.

BRIEF DESCRIPTION OF THE DRAWINGS

Other aspects and advantages of the invention appear in the following description given with reference to the figures, in which.

MORE DETAILED DESCRIPTION

Figure 1:
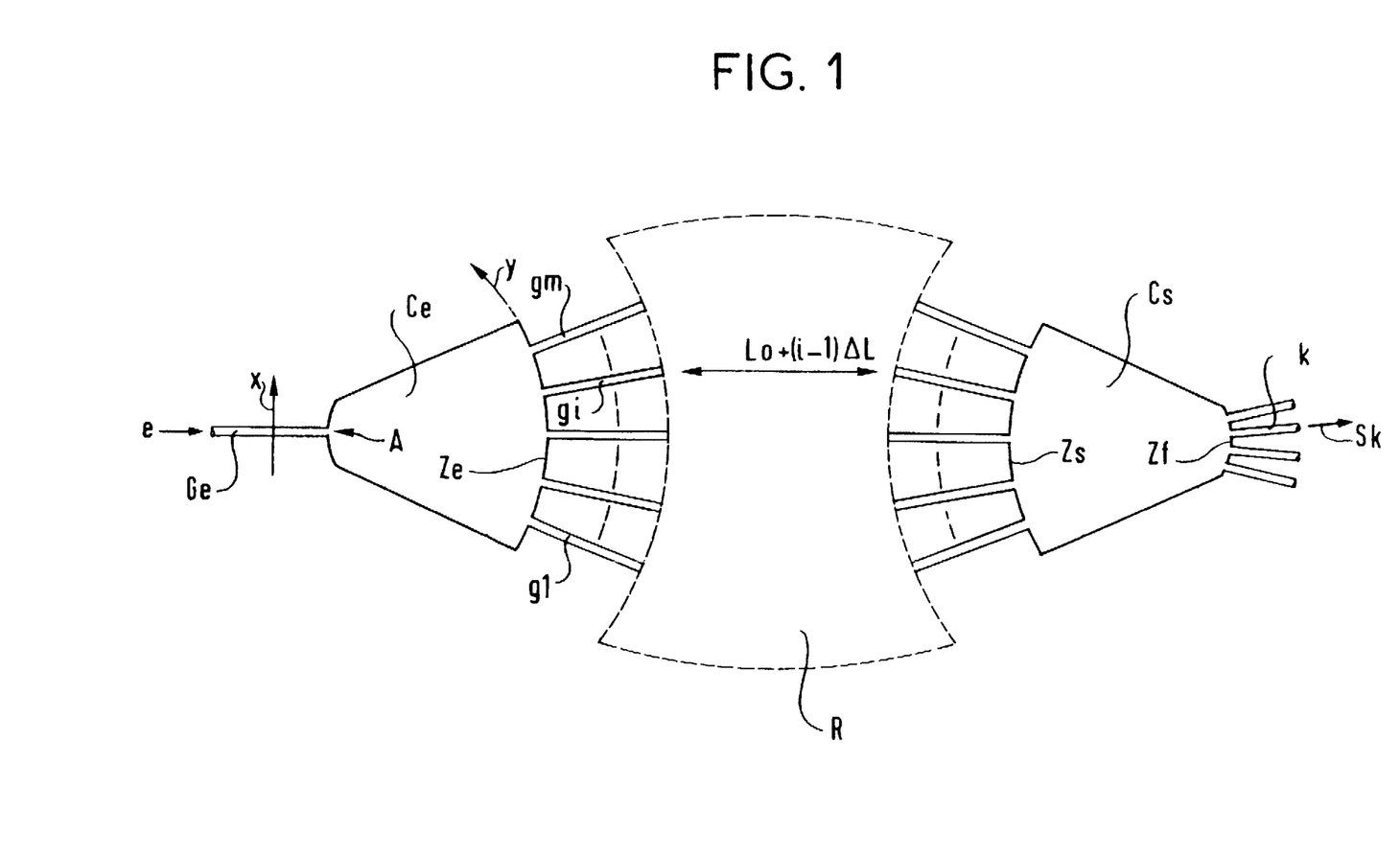
FIG. 1 is a diagram of an arrayed-waveguide grating demultiplexer implementing the invention.

FIG. 1 is a diagrammatic plan view of an arrayed-waveguide grating demultiplexer. It is constituted by a first star coupler Ce whose input A is connected to an input waveguide Ge. The face of the coupler Ce remote from the input waveguide Ge constitutes a reception surface Ze for receiving the input wave e injected by the waveguide Ge.

The surface Ze is connected to the input of a grating R constituted by an array of waveguides g1, . . . , gi, . . . , gm. The other end of the grating R is connected to an input surface Zs of a second star coupler Cs. The face thereof remote from its input surface Zs constitutes a focusing surface Zf which is connected to a plurality of output waveguides Gk. Each waveguide Gk is allocated to a determined wavelength.

In an integrated embodiment, the couplers and the waveguides are constituted by wave-guiding layers of small thickness.

Geometrically speaking, the two opposite faces of each coupler which are connected to the waveguides are cylindrical and they have the same radius. Generally, both couplers have faces of the same radius.

To obtain the demultiplexing function, the waveguides of the grating array are all of different optical lengths so that the relative phase differences created by the waveguides comply with a linear function y of the waveguide inputs on the reception surface Ze. For reasons of compactness and of simplicity, the inputs of the waveguides gi are uniformly spaced apart along the reception surface Ze. Their outputs are likewise regularly spaced apart along the input surface Zs of the second coupler Cs. The length of a waveguide gi of order i is then equal to $Lo+(i-1)\Delta L$, where Lo is the wavelength of the shortest waveguide g1 and $\Delta L$ is the pitch of the grating.

If $\lambda o$ is the wavelength in a vacuum that is to be focused at the center of the focusing surface Zf of the second coupler, then $\Delta L$ is selected to be equal to $m\lambda o/n$, where m is the order of the grating and n is the refractive index applicable to the guiding layers of the grating.

In operation, the wave to be demultiplexed e which is assumed to be a monomode wave, is injected into the first coupler Ce via the input waveguide Ge. The waves at various different wavelengths constituting the multiplex are then focused on the surface Zf at different positions and the corresponding output waves Sk are received by the output waveguides Gk.

Figure 2:
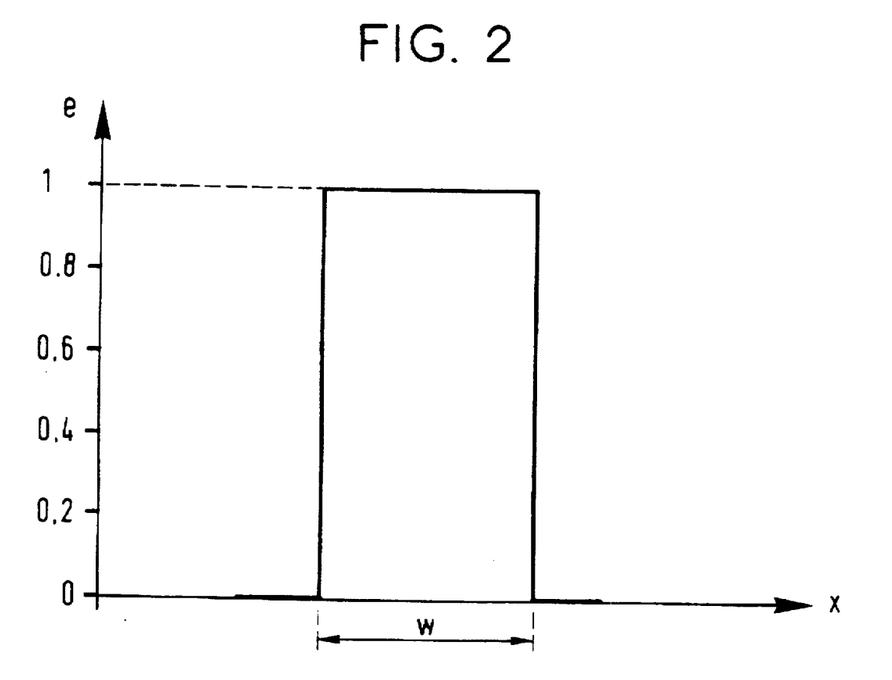
FIGS. 2 to 5 are curves for explaining the operation of the demultiplexer of the invention.
Figure 3:
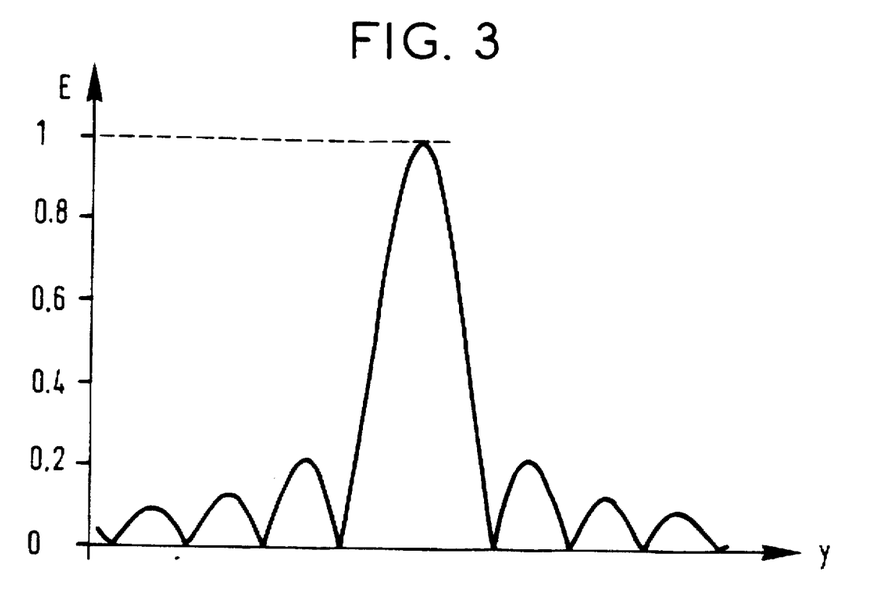

By treating each coupler as an empty space in two dimensions, a rectangular spectral response would be obtained for each output wave, providing the amplitude of the input wave e as a function of the transverse position x of the input waveguide Ge could be represented by a rectangle as shown in FIG. 2, where e is amplitude in relative units and w is the width of the waveguide. The amplitude of the diffractive wave E appearing on the reception surface Ze would then satisfy a cardinal sine (sinc) relationship on the reception surface Ze as a function of position y, as shown in FIG. 3, where E is amplitude in relative units. If the dimensions of the surfaces Ze and Zs are sufficient to receive all of the secondary lobes of significant amplitude in the diffractive wave E, then the spectral response obtained at the output would be in the form of a rectangle.

This ideal case is not achievable in practice since the rectangular profile of FIG. 2 is physically impossible. Also, the dimensions of the surfaces Ze and Zs are necessarily limited, so the number of secondary lobes that they can receive is itself limited.

Figure 4:
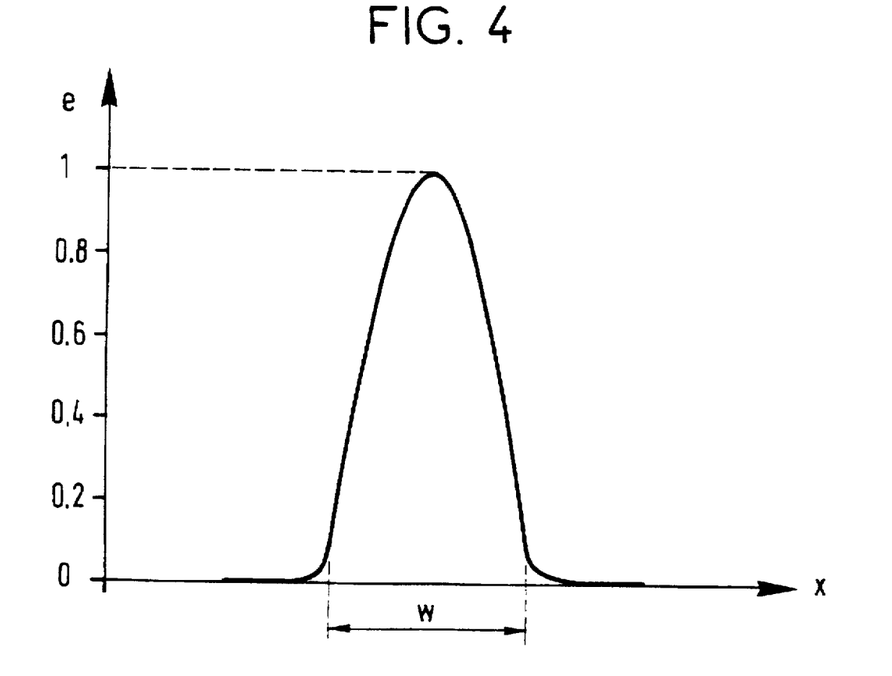
Figure 5:
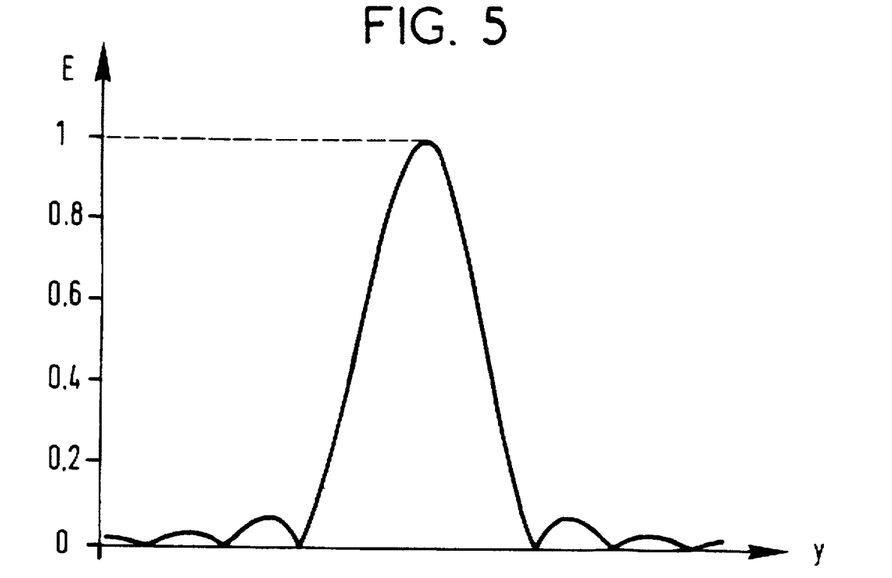
Figure 7:
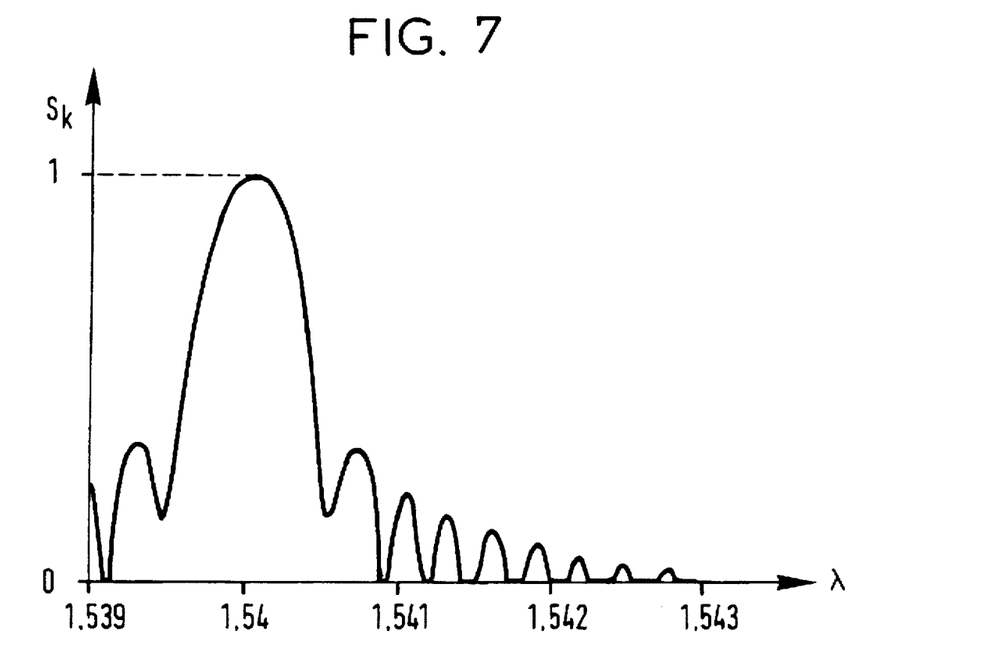
FIGS. 7 and 8 are spectral response curves obtained respectively using a conventional grating demultiplexer and a demultiplexer of the invention.
Figure 8:
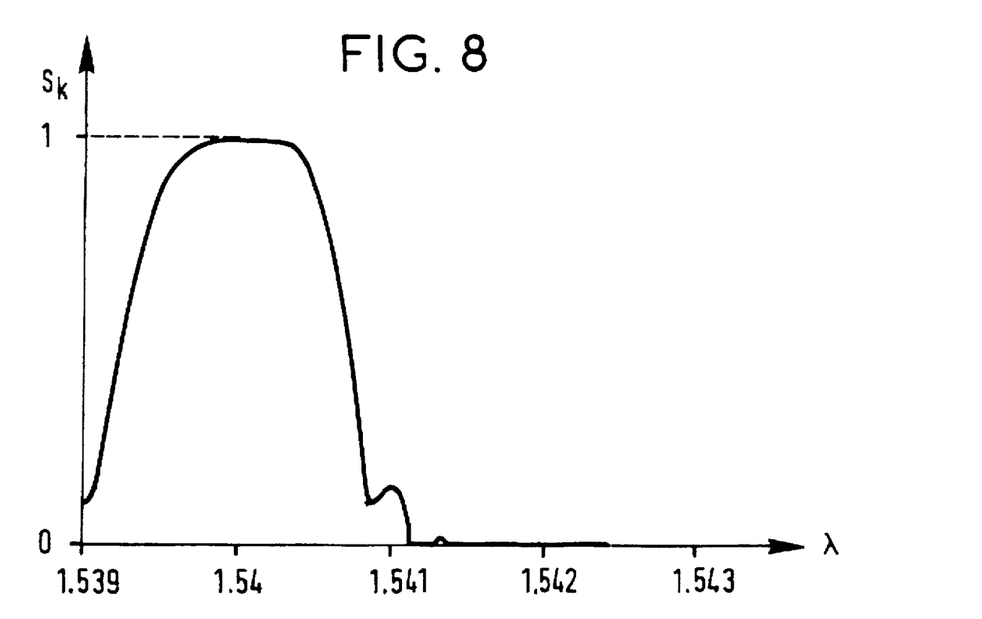

FIG. 4 shows an input waveform that is achievable in practice by very great confinement of the wave in the input waveguide. The diffractive wave E that results therefrom is shown in FIG. 5. It can be observed that the main lobe is broader than in FIG. 3. Nevertheless, simulations and experiment have shown that if the grating R includes at least two waveguides placed to receive portions of the two secondary lobes situated on either side of the main lobe, then significant improvement of the spectral response can already be obtained. Thus, with a particular embodiment using the structure shown in FIG. 6 where the grating comprises an array of 36 waveguides, the spectral response for one of the output waveguides Sk has the appearance given in FIG. 8. However, if conventional apparatus had been used with an input waveguide having ordinary confinement, i.e. less than 95%, then the spectral response would have had the appearance shown in FIG. 7.

Figure 6:
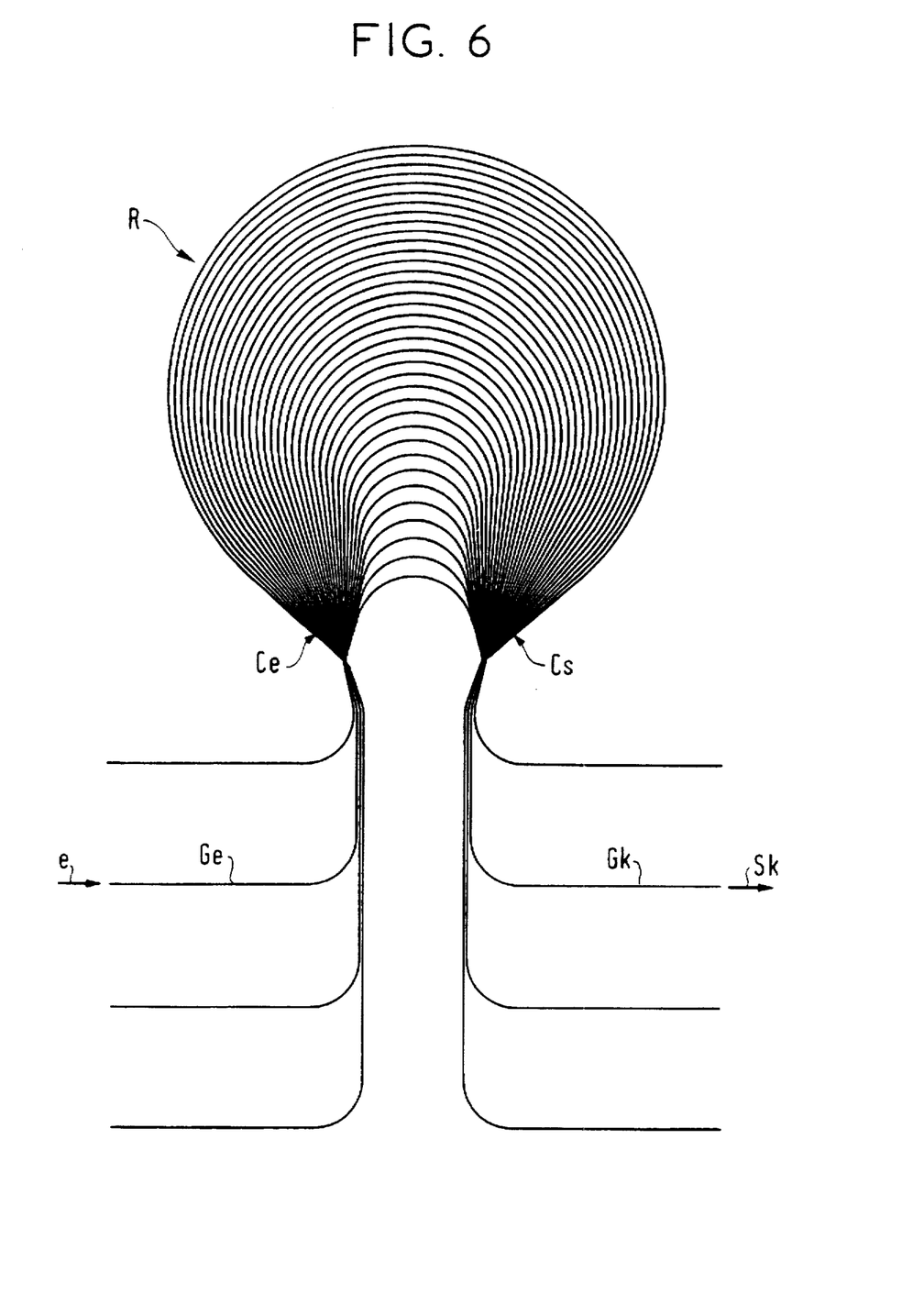
FIG. 6 is an overall view of a particular embodiment of a demultiplexer of the invention.

We now give the detailed embodiment characteristics of the multiplexer shown in FIG. 6:

InP substrate;

composition of the wave-guiding layers: InGaAsP;

effective refractive index n=3.22;

number of waveguides in the grating=36;

radius of the surfaces Ze and Ze=85 µm;

width of the input waveguides w=2 µm;

spacing between the axes of the waveguides at the couplers=2.7 µm;

µo=1.54 µm; and order of the grating m=146.

In this embodiment, the waveguides of the grating take into account the main lobe and, in practice, both adjacent secondary lobes. The sector centered on the input A of the coupler Ce and covering Ze is then of an angle greater than 65°. The coupler Cs is identical to the coupler Ce.

In general, to recover two secondary lobes, it is possible to estimate the minimum value αm of the above-defined sector angle as follows: $\alpha m=4\lambda o/(N \cdot W)$, where $\lambda o$ is the mean wavelength in a vacuum of the mutiplex to be processed, n is the effective refractive index of the guiding layer, and w is the width of the waveguide.

Finally, it can be observed that the demultiplexer is symmetrical and includes as many input waveguides as it includes output waveguides. Thus, it is possible to interchange outputs and inputs. Also, this achieves redundancy that can be useful in the event of one or more of the input waveguides failing.

Figure 9:
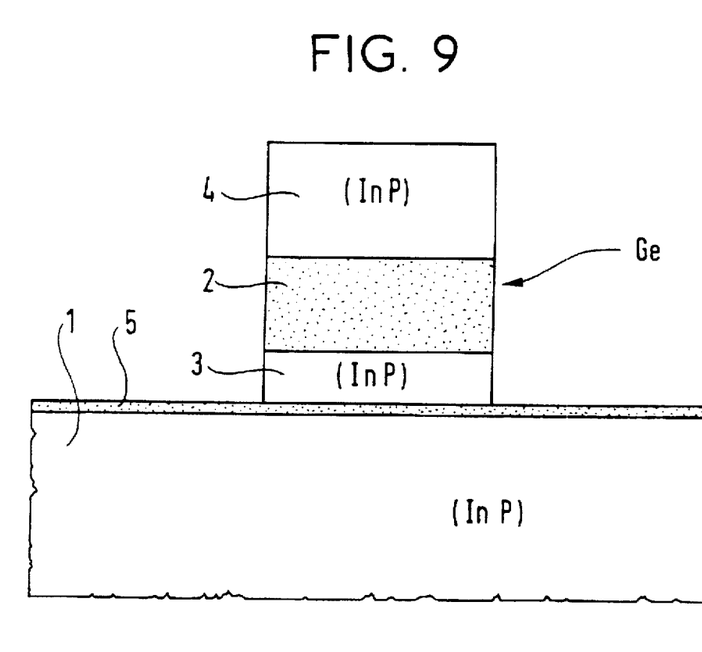
FIG. 9 is a cross-section of an input waveguide in an embodiment of the invention.

FIG. 9 shows an embodiment of the input waveguide Ge making it possible to obtain a very high confinement factor, e.g. in excess of 99% with any type of material that is usable in practice. In this example, the guiding layer 2 is made out of a quaternary InGaAsP alloy and is buried in a substrate of indium phosphide. To form the waveguide, lateral etching is subsequently performed down to the etching stop layer 5 situated beneath the wave-guiding layer 2. Thus, the layer 2 is surrounded on either side by air and it is defined by bottom and top confinement layers 3 and 4 of indium phosphide.

By way of example, the following dimensions may apply:

thickness of the wave-guiding layer 2: 0.8 μm;

width of the wave-guiding layer 2: 2 μm;

thickness of the bottom layer 3: 0.4 μm;

thickness of the top layer 4: 0.9 μm.

Naturally, the invention can be integrated in other materials possessing suitable optical properties. By way of example, mention can be made of gallium arsenide, silicon or silica, alumina, lithium niobate, and certain polymers.

In a variant, it is also possible to use the waveguide grating in reflection. Under such circumstances, use is made only of the first coupler Ce whose outputs are connected to a grating constituted by an array of waveguides of different lengths and terminating in reflecting faces. As in the above embodiment, the grating includes waveguides placed to receive at least a fraction of the secondary lobes that are formed on the reception surface Ze.

Figure 10:
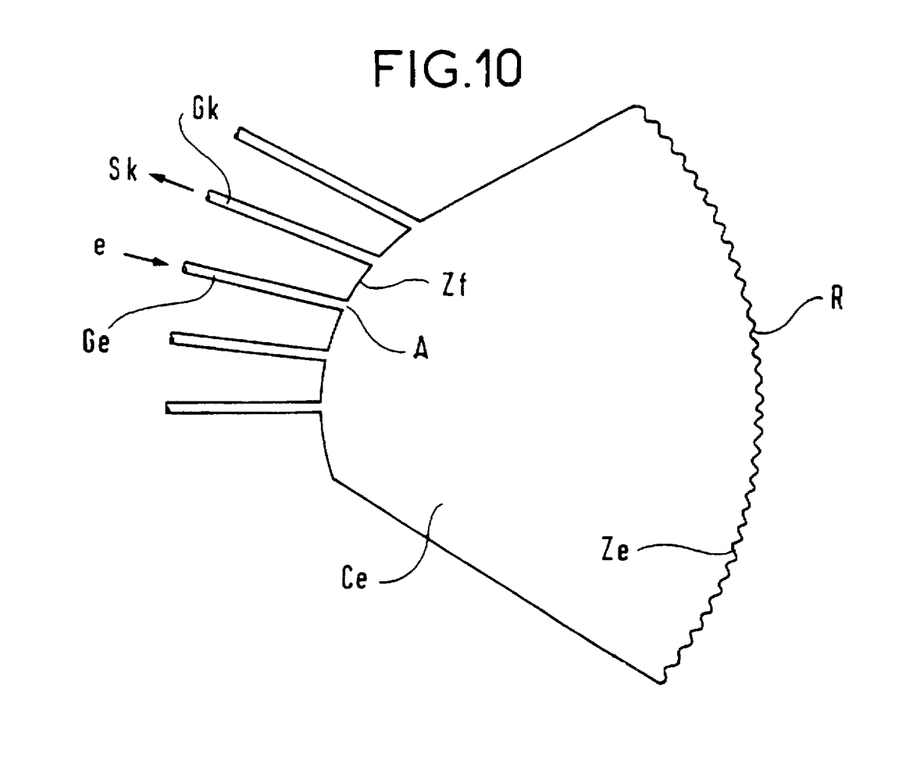
FIG. 10 is a diagram of an etched grating demultiplexer to which the invention can also be applied.

In another variant embodiment of the invention, it is possible to use an etched grating demultiplexer as shown diagrammatically in FIG. 10. The reflecting etched grating R is functionally equivalent to the waveguide grating of the preceding variant.

Unlike the first embodiment, gratings that operate in reflection make it impossible to use a wavelength in the input multiplex that comes to a focus on coupler input point A.

We claim:

1. A wavelength demultiplexer comprising:
   a diffraction space including:
      at least one input;
      an input waveguide, coupled to said at least one input and serving to inject an input optical wave into said diffraction space, and
      a reception surface arranged to face said input, said input waveguide and said reception surface being dimensioned so as to form a diffracted wave, from an input optical wave, on said reception surface having amplitude as a function of position on said reception surface and including at least a portion of a plurality of secondary lobes of said diffracted wave;
   a focusing surface, and
   a grating, coupled to said reception surface, said grating focusing an output wave on said focusing surface at a position that is a function of the wavelength of the input optical wave.

2. A demultiplexer according to claim 1, wherein the input waveguide includes a wave-guiding layer defined laterally by a medium of refractive index lower than that of the wave-guiding layer, and wherein the dimensions of the cross-section of the wave-guiding layer and the values of said refractive indices are selected in such a manner that the input waveguide has a lateral confinement factor of not less than 95%.

3. A demultiplexer according to claim 1, wherein the input waveguide is a laterally etched, buried wave-guiding layer.

4. A demultiplexer according to claim 1, having a first star coupler and a second star coupler, wherein said diffraction space is said first star coupler having an output connected to said second star coupler by means of a grating of waveguides of different lengths, said focusing surface being constituted by a face defining said second star coupler and situated remote from said grating, and wherein said grating includes waveguides placed to receive a portion of said secondary lobes.

5. A demultiplexer according to claim 1, wherein said diffraction space is a star coupler connected at its output to a grating of waveguides of different lengths and terminating in reflecting faces, and wherein said grating includes waveguides placed to receive at least a portion of said secondary lobes.

6. A wavelength demultiplexer, comprising a diffraction space, a grating, and a focusing surface, said diffraction space including at least one input coupled to an input waveguide and a reception surface situated facing said input and coupled to the grating, said input waveguide serving to inject an input optical wave into the diffraction space, said grating being designed to focus an output wave on the focusing surface at a position that is a function of the wavelength of the input wave, wherein said input waveguide and said reception surface are dimensioned in such a manner that in response to an input optical wave a diffracted wave is formed on the reception surface having amplitude as a function of position on the reception surface presenting at least a portion having a plurality of secondary lobes, wherein said diffraction space is a coupler whose face remote from said input is a reflecting etching grating constituting both said reception surface and said grating.

7. A wavelength demultiplexer, comprising a diffraction space, a grating, and a focusing surface, said diffraction space including at least one input coupled to an input waveguide and a reception surface situated facing said input and coupled to the grating, said input waveguide serving to inject an input optical wave into the diffraction space, said grating being designed to focus an output wave on the focusing surface at a position that is a function of the wavelength of the input wave, wherein said input waveguide and said reception surface are dimensioned in such a manner that in response to an input optical wave a diffracted wave is formed on the reception surface having amplitude as a function of position on the reception surface presenting at least a portion having a plurality of secondary lobes, wherein said demultiplexer is integrated in a semiconductor material.

8. A demultiplexer according to claim 7, wherein said semiconductor material is indium phosphide.

9. A wavelength demultiplexer, comprising a diffraction space, a grating, and a focusing surface, said diffraction space including at least one input coupled to an input waveguide and a reception surface situated facing said input and coupled to the grating, said input waveguide serving to inject an input optical wave into the diffraction space, said grating being designed to focus an output wave on the focusing surface at a position that is a function of the wavelength of the input wave, wherein said input waveguide and said reception surface are dimensioned in such a manner that in response to an input optical wave a diffracted wave is formed on the reception surface having amplitude as a function of position on the reception surface presenting at least a portion having a plurality of secondary lobes, wherein said demultiplexer is integrated in silicon.

10. A wavelength demultiplexer comprising:
   a diffraction space including:
      at least one input;
      an input waveguide, coupled to said at least one input and serving to inject an input optical wave into said diffraction space;
      a reception surface arranged to face said input, said input waveguide and said reception surface being dimensioned so as to form a diffracted wave, from an input optical wave, on said reception surface having amplitude as a function of position on said reception surface and including at least a portion of a plurality of secondary lobes of said diffracted wave, and a focusing surface, and a reflective grating, coupled to said reception surface, said grating focusing an output wave on said focusing surface of said diffraction space at a position that is a function of the wavelength of the input optical wave.

11. A wavelength demultiplexer according to claim 1, wherein said grating is an etched grating.

12. A wavelength demultiplexer according to claim 1, including an array of waveguides, interposed between said grating and said reception surface, for transmitting said diffracted wave to said grating, such that the length of each waveguide i of said array of waveguides is equal to: $Lo+(i-1)\Delta L$, where Lo is the wavelength of the shortest waveguide and $\Delta L$ is the pitch of the grating.

13. A wavelength demultiplexer according to claim 1, wherein said focusing surface comprises means for delimiting a second diffraction space.

* * * * *